United States Patent [19]

Ashkin et al.

[11] 3,793,541

[45] Feb. 19, 1974

[54] OPTICAL STIMULATED EMISSION DEVICES EMPLOYING OPTICAL GUIDING

[75] Inventors: Arthur Ashkin, Rumson; Erich Peter Ippen, Middletown, both of N.J.

[73] Assignee: Bell Telephone Laboratories, Incorporated, Murray Hill, Berkeley Heights, N.J.

[22] Filed: Dec. 21, 1970

[21] Appl. No.: 99,990

Related U.S. Application Data

[63] Continuation-in-part of Ser. No. 5,713, Jan. 26, 1970.

[52] U.S. Cl............... 307/88.3, 321/69 R, 330/4.3, 331/94.5, 350/96 WG
[51] Int. Cl............................................... H01s 3/00
[58] Field of Search...... 350/96 R, 96 WG; 330/4.3; 331/94.5; 307/88.3; 321/69 R

[56] References Cited
UNITED STATES PATENTS

| | | | |
|---|---|---|---|
| 3,297,875 | 1/1967 | Garwin et al. | 307/88.3 |
| 3,386,787 | 6/1968 | Kaplan | 350/96 WG |
| 3,399,012 | 8/1968 | Peters | 350/96 WG |

*Primary Examiner*—Herman Karl Saalbach
*Assistant Examiner*—Darwin R. Hostetter
*Attorney, Agent, or Firm*—W. L. Wisner

[57] ABSTRACT

There is disclosed a coherent optical device in which a fluid active medium is included in a guiding structure and stimulated emission of coherent radiation is achieved by monochromatic light launched into the guiding structure with a power level several orders of magnitude less than that necessary for any previous such device or by a substantially less concentrated fluid active medium than previously used at prior art low power levels. The guiding structure typically includes an active fluid contained in a drawn capillary tube of internal diameter in the range from about 0.5 micron to about 50 microns or disposed about an optical fiber of comparable transverse dimension. The active fluid can be flowed in a direction either along or transverse to the axis of the guiding structure. The disclosed species include stimulated Raman emission devices and dye lasers.

36 Claims, 8 Drawing Figures

(END VIEW)

OPTICAL STIMULATED EMISSION DEVICES EMPLOYING OPTICAL GUIDING

CROSS REFERENCE TO RELATED APPLICATION

This application is a continuation-in-part of our co-pending application Ser. No. 5713, filed Jan. 26, 1970.

BACKGROUND OF THE INVENTION

This invention relates to coherent optical devices, such as frequency converters, super-radiant devices and coherent radiation amplifiers. Such devices include stimulated Raman emission devices and dye lasers. quality In prior Raman-active devices, the achievement of oscillation threshold has required a process of filament formation in which the pumping light is of such a power level that it produces refractive index changes in the active medium that tend to trap the radiation in a large number of filamentary regions, or has required extremely high pump power levels. Such operation is attended by a rapid degradation of the optical quality of the Raman-active medium. The medium becomes damaged and less transmissive than originally.

In prior continuous-wave dye lasers, the lowest thresholds have been achieved with highly focused pump light that pumps the fluid active medium in a short pathlength. Deleterious thermal effects have required that large flow rates be employed. In pulsed operation, with higher peak powers applied, oscillations have been achieved with longer pathlengths and lower dye concentration; but the longer the pulse length, the larger the rate of flow must be. The thermal effects involve mainly thermal defocusing. Nevertheless, in addition to these effects, permanent bleaching of dye molecules is also significantly deleterious to the laser action, both for ultraviolet light pumping and for visible light pumping, e.g., from argon ion lasers.

It is desirable that the performance of fluid-type optical oscillators of both of the above-described varieties be improved.

SUMMARY OF THE INVENTION

We have discovered that Raman oscillation and other useful Raman effects can be achieved in a guided structure typically a dielectric capillary tube having an internal diameter in the range from about the wavelength of the supplied monochromatic radiant energy therein to about 100 times that wavelength. We have recognized that the principles of Raman oscillators according to our invention are also applicable to dye lasers and directly lead to improved forms of dye lasers.

The Raman oscillation is achieved with a power level of the supplied radiation that is more than an order of magnitude below that required in prior Raman oscillators and below the bulk oscillation threshold. The bulk oscillation threshold is the threshold for oscillation in a Raman-emission device, as calculated from the Raman cross section without guiding of the pump light or Raman-scattered light. In most of our experiments, the supplied radiation had a power about three orders of magnitude lower than that which would produce filament formation in some Raman-active liquids and more than one order of magnitude lower than that required for oscillation in other Raman oscillators. For example, we have achieved Raman oscillation in carbon disulfide with less than about 10 watts of power at $0.5145\mu$ from an argon ion laser.

Two surprising advantages of our invention are the highly acceptable quality of guiding obtained in the presence of high pumping light intensity in a capillary tube drawn down to such small internal diameters, and the relatively low apparent rate of damage of the active medium. In addition, for both Raman oscillators and dye lasers, the strong guiding action itself counteracts any residual thermal effects, such as thermal lens effects.

In addition, deleterious thermal effects such as thermal defocusing, characteristic of high-power liquid optical devices such as dye lasers, are avoided in devices according to our invention because guiding of the pump beam enables relatively long pathlengths in a medium of relatively low dye concentration without any loss of total gain, and also makes possible significantly smaller effective spot sizes with consequent increase in gain. Moreover, continuous-wave pumping than becomes feasible at reasonable flow rates of the liquid active medium because we flow the liquid medium only at a reate sufficient to overcome bleaching effects. This rate is very much less than that required to overcome thermal effects in prior art dye lasers. In fact, thermal effects have become less important than bleaching in a dye laser according to our invention.

According to one subordinate feature of our invention, deterioration of a Raman-active medium is avoided by flowing medium from a pressurized relatively large reservoir through the guiding capillary tube. The flow rate is such that a reservoir of less than 1 liter capacity could supply active medium flowing through the tube for many weeks or years.

According to another feature of our invention, dye lasers advantageously employ modified optical guide arrangements that permit transverse flow of the dye. Some of these embodiments employ evanescent field, or fringing field, pumping of the active medium in the region of contact with a passive member of high index. One of these embodiments, in particular, employs a passive member which is a glass fiber of about 0.1 micrometer to 50 micrometer diameter.

Advantageously, in some specific embodiments, fluid source and outflow reservoirs are coupled to a dielectric capillary guide. The relatively large structures of such reservoirs in some of these embodiments serve as convenient rigid mounting means for windows or reflectors for an oscillator, especially since a capillary tube tends to be highly flexible and can even be wound into a compact coil.

Other subordinate features of our invention relate to pin-type coupling elements and pin-joint coupling of multiple sections of a liquid optical guide.

In another specific embodiment of our invention, the problems of prior Raman-active devices are so completely avoided that super-radiance via Raman-scattering is readily obtained in an extended capillary tube of the type used in our invention.

In still other specific embodiments of our invention, the relatively high gain per unit length available in a Raman-scattering device according to our invention makes possible some simplified amplifier structures providing one or two passes of a signal to be amplified in the tube and also simplified dichroic optical reasonators for oscillators that provide only one or two passes of the supplied pumping light. The pumping light can be substantially consumed in such a device.

BRIEF DESCRIPTION OF THE DRAWING

Further features and advantages of our invention will become apparent from the following detailed description, taken together with the drawing, in which:

FIG. 5 is a pictorial illustration of a glass pin-joint for multiple sections of a liquid optical guide;

FIG. 6 is a partially pictorial and partially block diagrammatic illustration of another embodiment employing a solid glass fiber surrounded by Raman-active liquid.

DESCRIPTION OF ILLUSTRATIVE EMBODIMENT

Figure 1:
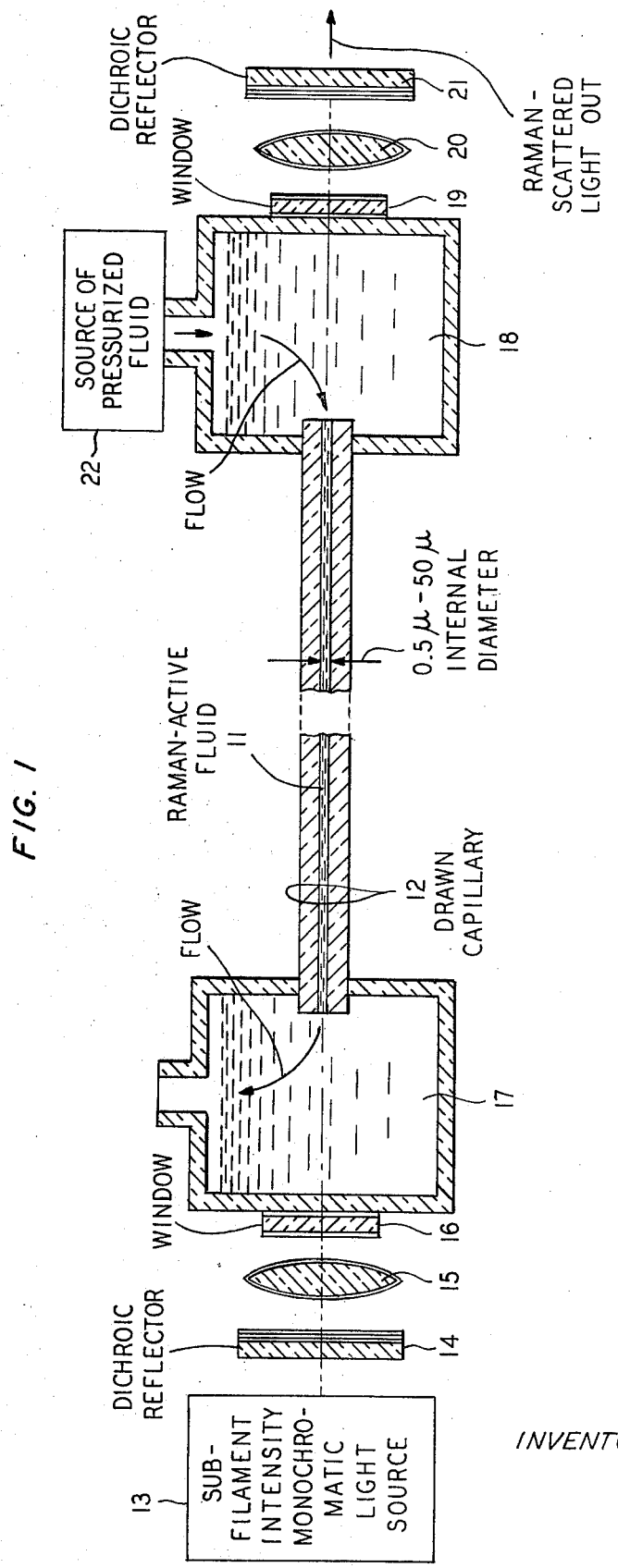
FIG. 1 is a partially pictorial and partially block diagrammatic illustration of a basic embodiment of an oscillator or frequency converter according to our invention.

In FIG. 1 Raman oscillation is to be achieved in the Raman-active fluid 11 contained within the guiding structure 12 which is a drawn capillary tube of lower refractive index than fluid 11 and having an internal diameter in the range from about $0.5\mu$ to about $50\mu$. The Raman oscillation is to be achieved in response to monochromatic light supplied from a source 13 through the dichroic reflector 14, which is transmissive of the monochromatic light, and through the focusing lens 15. Lens 15 focuses the beam down through window 16, the fluid in fluid reservoir 17 and into the end of tube 12.

The ends of drawn capillary tube 12 are supported by the rigid cases of the reservoirs 17 and 18; and reservoir 18 also supports the second end window 19 through which the output Raman-shifted light is transmitted to the focusing lens 20 and the dichroic reflector 21, which completes the resonator for the Raman-scattered light.

Specifically, dichroic reflector 14 is totally reflective at the frequency of the Raman-shifted light; and dichroic reflector 21 is partially reflective at that frequency and partially transmissive. Illustratively, dichroic reflector 21 can be totally reflective for any residual supplied light from source 13, so that it will be completely comsumed in the Raman-scattering process in fluid 11. Nevertheless, dichroic reflector 21 could also be transmissive at the frequency of the supplied light, especially if nearly all of the supplied light is consumed on a single pass through fluid 11. Dichroic reflector 21 can also be used to enhance or repress higher order Raman-scattering. Lenses 15 and 20 have focal lengths and dispositions in the optical resonator to direct most of the Raman-scattered light reflected from the adjacent relector back into the bore of the drawn capillary tube 12. The fluid 11 in reservoir 18 is pressurized by a source 22, illustratively a source of an inert gas such as nitrogen at a pressure above atmospheric pressure. The reservoir 17 is vented to the atmosphere.

In our experiments, we have achieved oscillation in a configuration like that of FIG. 1 in which the Raman-active fluid is carbon disulfide and the supplied light from source 13 is light from an argon ion laser operating at $0.5145\mu$ in the green region of the spectrum, with pulses about 20 microseconds long and having peak powers in various experiments ranging from about 5 watts to about 10 watts. This power level contrasts to a peak pulse power of several tens of kilowatts at this wavelength required in prior art Raman oscillators, even those employing guided structures. Further, the drawn capillary tube 12 was a drawn glass tube having an index of refraction 1.55 and an internal diameter of about $12\mu$. The drawing of the tube 12 from larger diameter tubing is observed to improve its structural uniformity and optical quality. It is noted that carbon disulfide has an index of refraction of about 1.64, which is sufficiently higher than that of the glass to provide satisfactory guiding of both the pump light and the Raman-scattered light. The output Raman-shifted pulses in our experiments had a frequency of $5.64 \times 10^5$ gigahertz (which corresponds to a wavelength of 5,325 A), as contrasted to a frequency of $5.84 \times 10^5$ gigahertz (which corresponds to a wavelength of 5,145 A) of the supplied light from argon ion laser source 13.

The preferred pressure supplied by source 22 was 5 pounds per square inch, which was more than adequate to maintain superior optical quality of the medium within capillary 12. Since the capillary tube 12 was about 1 meter long, our calculations of the gain per unit length in fluid 11 showed that it was about 3 percent per centimeter.

It should be readily apparent to one skilled in the art that with continual replenishment of the active medium, continuous wave oscillation can be achieved with a continuous-wave source 13. Such an oscillator would be a very desirable source of a locak oscillator wave for an optical communication system. Several such devices pumped by the same source 13 could provide several different frequency shifts from the frequency of the supplied light and thus provide a plurality of sources suitable for a frequency-multiplexed communication system. To that end, it is merely necessary to change the frequency of peak reflectiveity of the dichroic reflectors 14 and 21 and/or to change the Raman-active medium. Such reflectors are typically made by conventional techniques employing multiple dielectric layers upon a conventional transmissive substrate.

Such changes of the peak reflectivity of the reflectors of the resonator are advantageous for use with other Raman-active media, such as benzene. Benzene could illustratively be mixed with carbon disulfide to insure that the index of refraction of the medium exceeded that of capillary tube 12. Nevertheless, Raman oscillation would be achieved in the benzene with a suitable choice of the resonator characteristics.

Possible other liquids:

| | n | Shift cm$^{-1}$ |
|---|---|---|
| Benzene | 1.50 | 992 |
| Methyl iodide | 1.75 | 533 |
| Pyridine | 1.51 | 991 |
| Iodo-Benzene | 1.62 | 999 |
| Bromo-Benzene | 1.56 | 1000 |
| Chloro-Benzene | 1.523 | 1002 |
| O-Nitrotoluene | 1.54 | 1340 |
| Nitro-Benzene | 1.56 | 1345 |

| CS$_2$ | 1.64 | 656 |

This list should not be constructed to exclude Raman-active liquids. All of the above are readily used by themselves in quartz or pyrex tubes. Other media would be mixed with a high-index liquid such as CS$_2$. Solutions of several Raman-active liquids mixed together are feasible.

Techniques for drawing capillary tubes to the required internal diameter are known (or described on a separate sheet).

Figure 2:
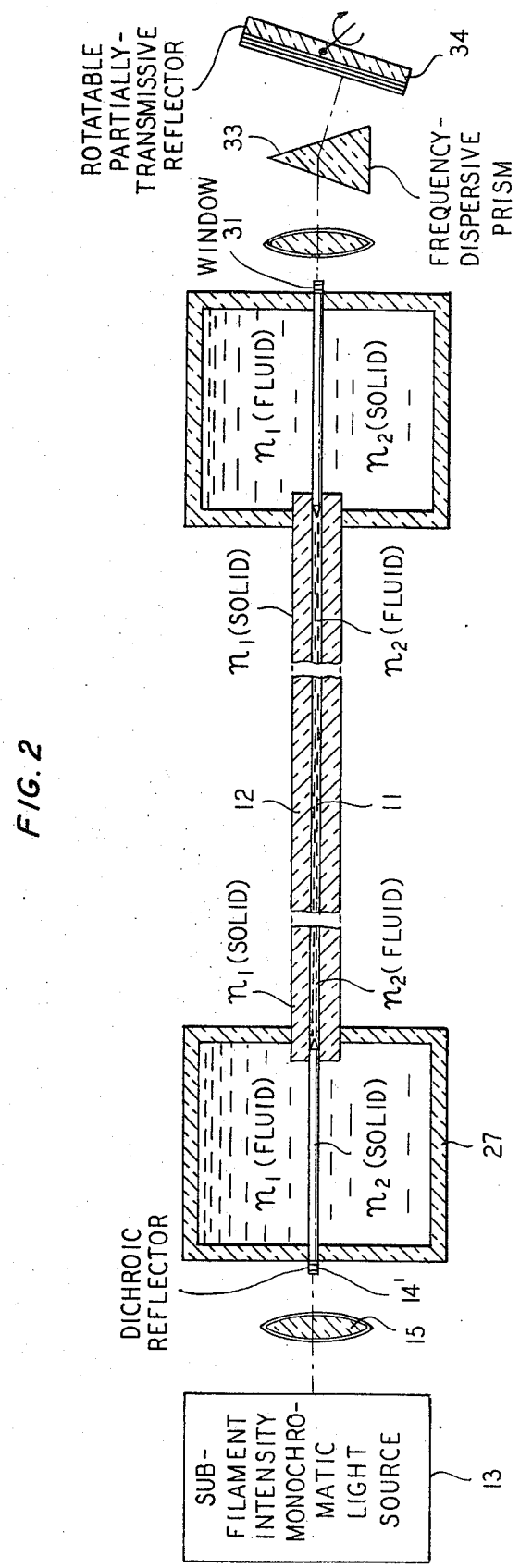
FIG. 2 is a modification of the embodiment of FIG. 1 providing pin-type mode coupling and dispersive frequency selection or tuning.

In the modified embodiment of FIG. 2, the fluid flow is eliminated, since oscillation can be achieved at such low and relatively nondamaging power levels from the monochromatic light source 13. Lens 15 now focuses the monochromatic light through the modified dichroic reflector 14' which is mounted upon the end of a glass pin 25 and is suitably matched thereto. The glass pin 25 has an index of refraction equal to that of the Raman-active fluid 11 and has tapered end shape protruding into the end of capillary tube 12 to match a selected mode, illustratively the lowest order mode, into the guided structure. The fluid 26 in fluid case 27 in this instance has an index of refraction substantially matching that of the glass of the drawn capillary tube 12. Pin 28, fluid 29 in case 30, and case 30 at the other end of tube 12 are similar to those of the left-hand end. Nevertheless, at the end of pin 28 at the surface of case 30, a highly transmissiive window 31 for the Raman-shifted light is disposed so that it may be focused by lens 32 through the frequency-dispersive prism 33 upon the rotatable reflector 34.

The various Raman-scattered lines induced in medium 11 by source 13 are angularly separated by prism 33, so that rotation of mirror 34 selects a particular one for oscillation in the resonator formed by reflector 14' and reflector 34.

By way of amplification of the modified embodiment of FIG. 2, it should be noted that pins 25 and 28 do not have to be tightly fitted in the ends of tube 12 and could, indeed, permit some fluid flow so that the flow technique of FIG. 1 could be employed.

The use of pins such as pins 25 and 28 permits a great deal of flexibility as to where the reflectors are disposed to form a resonator for the Raman-scattered light.

Figure 3:
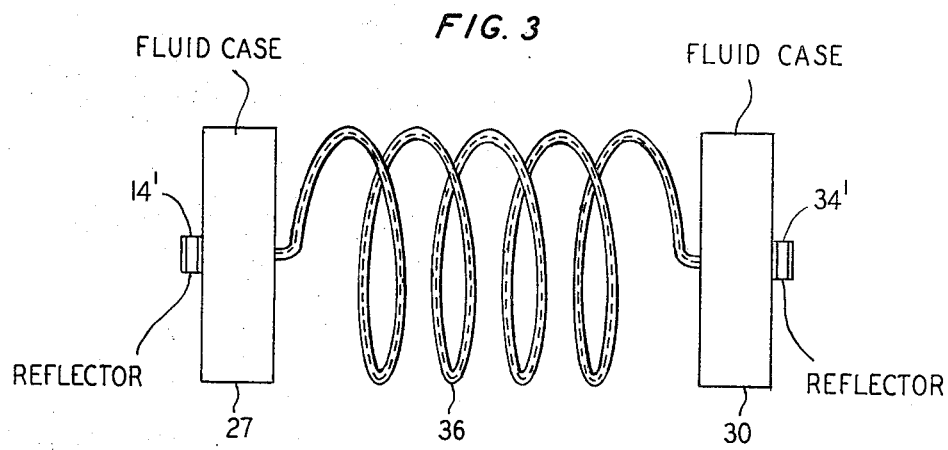
FIG. 3 illustrates one possible very compact spiral form of the guiding structure with reservoirs.

A further modified embodiment is shown in FIG. 3. in which the reflectors 14' and 34' are both disposed at the outer surfaces of the fluid cases 27 and 30 in alignment with the ends of a dielectric capillary tube 36 which is wound into a compact coil-like form between the cases 27 and 30.

In the embodiment of FIG. 3, a frequency converter employing a capillary tube 36 of many meters length could be made so compact tha the geometric distance between the reflectors 14' and 34' could be only 2 or 3 centimeters. It is also noteworthy that super-radiance can be achieved in a Raman-active medium in a device according to our invention in which no optical resonator at all is employed.

Figure 4:
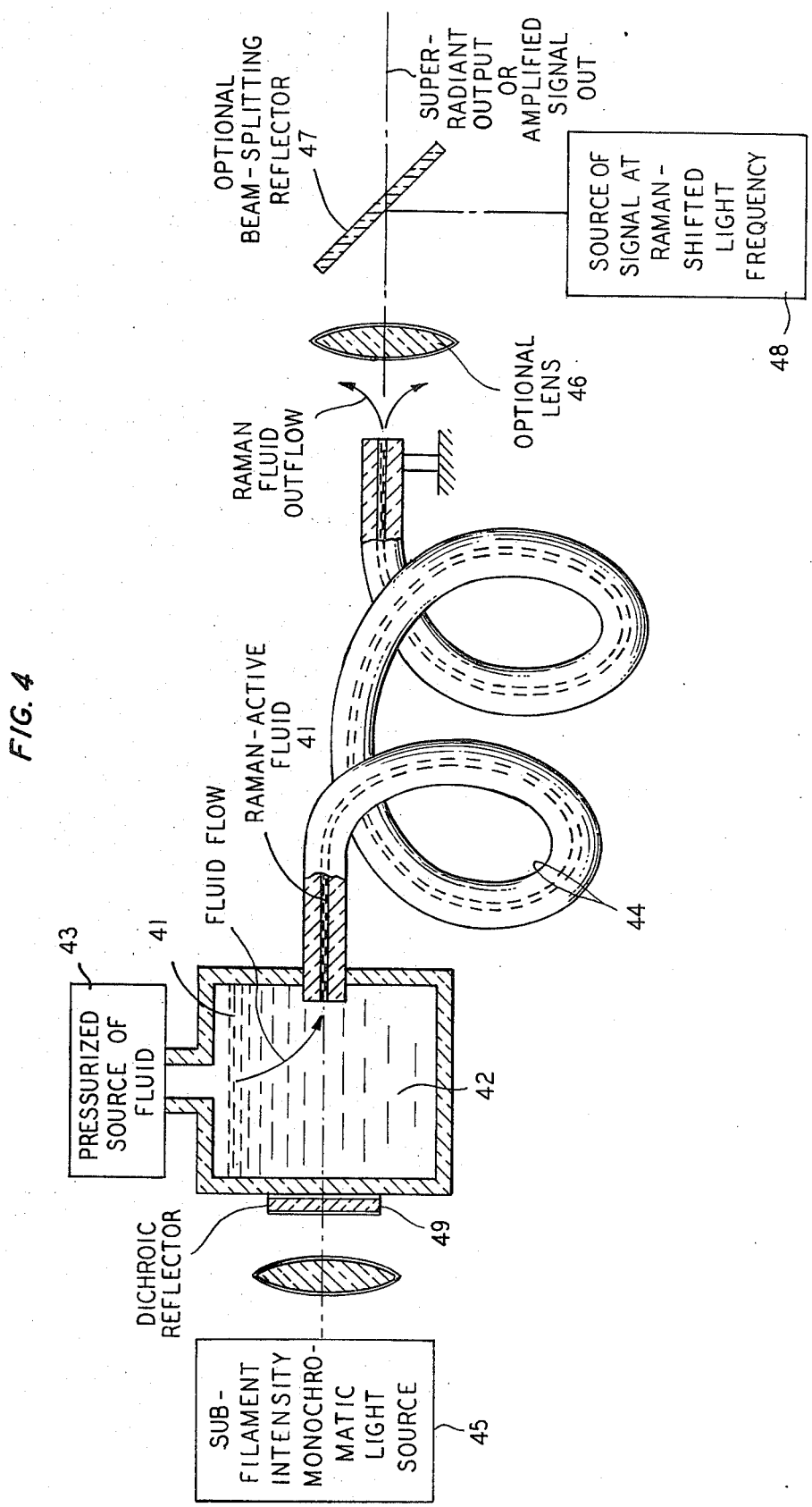
FIG. 4 is a partially pictorial and partially block diagrammatic illustration of a Raman-active device which can be either super-radiant or a Raman amplifier.

SUch a super-radiant embodiment of our invention is illustrated in FIG. 4. In FIG. 4 a reservoir 42 of Raman-active fluid 41 is pressurized by the pressurized gas source 43 to flow the medium through the coiled dielectric capillary tube 44 which is illustratively of the order of 10 meters long. Capillary tube 44 has an internal diameter of about 5 microns and an index of refraction sufficiently lower than that of medium 41 to provide effective guiding of both the supplied monochromatic light and the Raman-shifted light.

In view of the small cross-sectional area of the Raman-active fluid within capillary tube 44, the flow is extremely small and the Raman-active fluid can be simply allowed to flow freely out the opposite end of tube 44 and be lost. The monochromatic light source 45 is illustratively an argon ion laser operating at 5,145 A units at a continuous wave power level of about 1 watt.

For the purposes of the operation of the embodiment of FIG. 4 as a super-radiant device, the beam splitter 47, signal source 48 and dichroic reflector 49 are not present, and the lens 46 is optional, inasmuch as these are operational components to be used when an amplifier is desired.

The operation of the embodiment of FIG. 4 as a super-radiant device is facilitated by the shorter wavelength of light supplied by the source 45, inasmuch as the cross section of Raman-active media for Raman-scattering increases linearly with increasing frequency of the supplied light. Super-radiance employs a gain of about $e^{30}$, so that 10 watts pump power should be sufficient in a 3-4 meter long device. Our calculations show that a super-radiant output, which is a stimulated radiation beam with many of the qualitites of laser light, should be obtained at a Raman-shifted frequency of 5,325 A with an intensity of about 10 watts using a pump wavelength of 5,145 A. Also, the Raman-shifted light itself produces further Raman-scattering in the fluid 41 so that other weaker lines of Raman-shifted light may be obtained at the output. The stronger ones of these may also be super-radiant. In a modified version of the embodiment of FIG. 4, operation as an amplifier at a single Raman-shifted frequency is provided by the optional components 46 through 49, inasmuch as the signal from source 48 at the Raman-shifted frequency causes that particular Raman shift to be more easily stimulated and thus predominant.

In the operation of the embodiment of FIG. 4 as an amplifier, the Raman-shifted light scattered while the signal 48 is propagating toward reflector 49 is relfected along with the signal from that reflector 49 and is returned out through lens 46 and, in part, through beam splitter 47 as an amplified output signal. It may be noted that it is sufficient that beam splitter 47 is a half-silvered mirror, that is, one-half of the light from source 38 will be amplified; and one-half of the amplified output will be obtained to the right of the beam-splitting reflector 47.

The characteristic that strong Raman-shifted light in an embodiment like that of FIG. 4 or even of FIGS. 1 through 3 can produce further Raman-shifting can be used to advantage in a communication system to provide many different carrier frequencies as is desirable for a frequency-multiplexed system.

This result could be achieved in a multiple-section device. A joint structure for a multiple-section device is shown in FIG. 5. Illustratively, the Raman-active fluid 51 is contained in the glass capillary tube 52 to the left of the junction and in the similar glass capillary tube 53 to the right of the junction. Alternatively, two different Raman-active fluids could be in these two sections. In either event, the pin 54 is a glass pin of index matching those of the fluids and shaped with tapered ends to match a selected mode from the one section to the other. The pin supplies structural rigidity to the joint. Continuity in the guiding is provided by placing a viscous liquid such as glue 55 around pin 54 between the ends of tube 52 and 53 and having the same index of refraction as those tubes. The glue 55 also tends to hold the joint together. The liquid-solid-liquid phase discontinuity in the center and the solid-viscous liquid-solid discontinuities at the outer portions of the guiding structure help to provide structural strength; yet the guiding is not interrupted.

It should be clear that the same principles apply even if the liquid is not Raman-active. Thus, the joint will be useful in low-loss liquid optical guides.

Another embodiment of our invention is illustrated in FIG. 6. In FIG. 6, the focused pumping light from source 61 is transmitted through the Raman light reflector 62 into the solid glass fiber 63, which preferably has a diameter in the range from about 0.1 micron to about 5 microns for the fundamental transverse mode. Its diameter may extend to still higher values for higher order modes. The fiber 63 is surrounded by the Raman-active liquid 64 which has any typical index $n_L$.

It should be emphasized in this embodiment that any liquid Raman medium can be chosen. Guiding is provided by choosing the glass fiber 63 to have an index $n_{II} = n_L + \Delta n$, where $\Delta n$ is just large enough to insure that a substantial portion of the guided wave propagates in Raman-active liquid 64. The portion of the guided wave propagating in liquid 64 is inversely related to $\Delta n$ and the diameter of the guide.

An optical resonator for the Raman-scattered light is completed by the reflector 65 disposed at the opposite end of fiber 63 on the flush end surfaces of mounting block 68 and fiber 63. Reflector 65 is partially transmissive to couple part of the Raman-scattered light to utilization apparatus 66.

In operation, the portion of the guided wave propagating in liquid medium 64 produces Raman-scattering. The Raman-scattered light at frequencies lower than the pump frequency is resonated by the resonator formed by reflectors 62 and 65, and thereby produces coherent oscillations at the scattered light frequencies.

Figure 7:
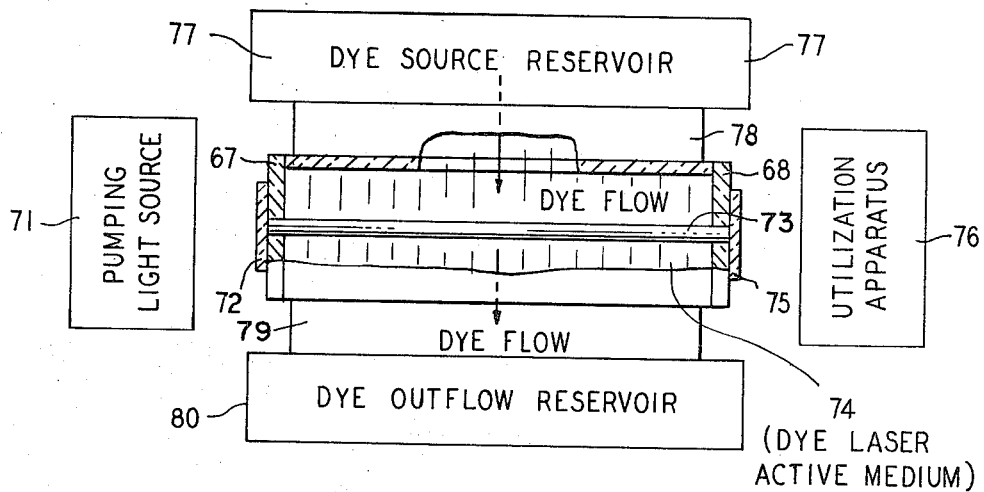
FIGS 7 and 8 show modifications of FIG. 6 employed as dye lasers.

Since the volume of liquid surrounding the active region of the liquid is large, the liquid 64 is self-healing with respect to optical damage. The self-healing may be promoted by flowing the liquid medium 64 past fiber 63. A modified embodiment providing such flow to avoid the effects of bleaching of the active medium in a dye laser is shown in FIG. 7 and described hereinafter. Such flow is also readily provided in the Raman oscillator embodiment of FIG. 6.

Also, an additional advantage of the embodiment of FIG. 6 is that very high quality optical fibers result from drawing larger fibers to the diameters mentioned.

In a typical example, liquid 64 is benzene (index 1.50), glass fiber 63 of diameter of one micron has an index of 1.50 + $\Delta n$ and mounting blocks 67 and 68 have indices less than that of fiber 63 and thus continue to guide the Raman-scattered light to end reflectors 62 and 65. Source 61 illustratively provides coherent pumping light at 0.5145 micron.

Fiber 63 can readily be made to propagate single-mode Raman-scattered light since the transverse mode structure depends not only on the fiber diameter but also upon the size of $\Delta n$.

In embodiments like that of FIG. 6, the central fiber 63 is flexible and is kept straight by slight tension and the fact that it is not substantially more dense than the Raman-active liquid 64. A curved configuration of fiber 63 is also usable if sufficient Raman-active liquid 64 is maintained around it.

In the embodiment of FIG. 7, a dye, such as Rhodamine 6G in an ethanol solution, is flowed from the dye source reservoir 77 through the connecting duct 78 into a liquid-containing oscillator structure much like that of FIG. 6. The oscillator structure includes the end plates 67 and 68 supporting the optical fiber 73 and the reflectors 72 and 75 of the dye laser resonator. After flowing around optical fiber 73, in the vicinity of which the dye is excited by pumping light guided by fiber 73 to promote a pipulation inversion, the dye is extracted through a duct 79 and deposited in the dye outflow reservoir 80.

Pumping light source 71 is illustratively an argon ion laser operating at a wavelength of 0.5145 micrometers; and utilization apparatus 76 need not be any different than that contemplated for any of the preceding embodiments. Nevertheless, it can advantageously respond to a very broad spectrum of wavelengths, as can be supplied by a dye laser.

Pertinent to the operation of the embodiment of FIG. 7 are the following data. Tests of the bleaching rate of Rhodamine 6G in an ethanol solution show that, when optically pumped at intensities required for laser threshold (about $10^5$ watts/cm$^2$ in our capillary tube optical guides of transverse dimensions in the 0.5–50 micrometer range, as above described), the Rhodamine 6G molecules have a usable lifetime of only 40 milliseconds. The destruction, principally bleaching, of the dye depends linearly on pump power density and appears to be permanent.

Rhodamine 6G in an air saturated solution of ethanol gave the lowest rate of bleaching of the dyes we examined. Accordingly, air saturation of dye 74 is recommended. Nevertheless, our tests were not exhaustive of all dyes and all additives; and better dyes and oxidizing additives or other beneficial additives could also be used in the embodiment of FIG. 7.

To take account of the observed 40 millisecond dye lifetime in the region of pumping at or above stimulated emission threshold, the dye should flow at a velocity of about 0.0025 centimeters per second per micron of diameter of fiber 73 at the point at which it is passing the axis of fiber 73. For reasonable economy in flowing the dye, the spacing between fiber 63 and the sidewalls (front and back) that define the flow channel should be of the order of the fiber diameter, but large enough to insure that no more than a negligible portion of the guided pumping light propagates in the vicinity of the sidewalls.

Pumping light sources 71 supplies about one watt of continuous-wave pumping power focused to a diameter of about 2 micrometers, which is the diameter of fiber 63. This power level is sufficient to make the power of the fringing (evanescent) field of the guided wave exceed $10^5$ watts per square centimeter with a fractional $\Delta n$ of only $1 \times 10^{-3}$. This $\Delta n$ is provided by selecting additives to the dye medium 74 to raise its index to nearly that of the glass fiber 73 (about 1.5). One additive is benzylalcohol. The power in the fringing field increases as $\Delta n$ decreases.

In operation, continuous-wave dye laser action is achieved because the optical guiding action of the high index fiber 73 surrounded by the relatively low index dye medium 74 enables relatively low pumping intensity together with relatively low dye concentrations to prevent thermal blooming, or defocusing, and to reduce dye molecule bleaching and thus attain a relatively moderate flow rate of the dye liquid medium around the central fiber 73.

Figure 8:
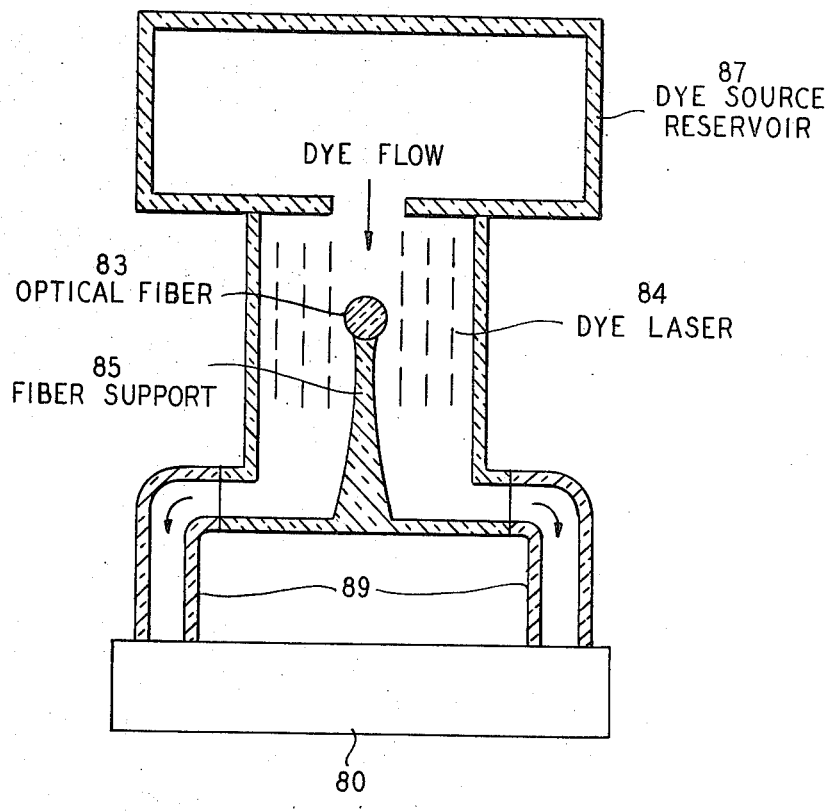

In FIG. 8, the embodiment of FIG. 7 is modified principally in the addition of the fiber support 85, which may be of the same index of refraction as the dye laser active medium 84. This modification and certain other modifications are most readily shown in an end view, a provided in FIG. 8. It should be understood that the pumping light source and utilization apparatus remain the same as in FIG. 7.

Optical fiber 83 may be substantially the same as fiber 73 of FIG. 7 and may have the same spacing from the sidewalls which define the flow path for the dye past the fiber.

The dye source reservoir 87 is modified from that shown in FIG. 7 by the elimination of the connecting duct 78. Similarly, the outflow duct 89 is in this case bifurcated inasmuch as the fiber support 85 requires that flow occur in such two distinct channels.

The operation of the embodiment of FIG. 8 can be substantially the same as that of FIG. 7. Nevertheless, a lower rate of dye flow could be achieved in approximately the following manner. First, the aperture or slit of reservoir 87 would be placed relatively close to fiber 83 and the sidewalls 91 and 92 would be moved in toward fiber 83 to define a flow path for the dye that is more restricted than that of FIG. 7.

Even some fringing of the pumping light field into and beyond sidewalls 91 and 92 might not be objectionable in view of the fact that this would permit a lower rate of consumption of the dye.

In the operation of all of the embodiments of FIGS. 6, 7 and 8 with dye laser active media, it should be understood that the stimulated radiation as well as the pumping radiation is guided by the fiber. This guiding occurs because substantially the same index relationship exists for the stimulated radiation as exists for the pumping radiation.

We claim:

1. A device of the type in which a fluid active medium is included in a guiding structure coupled to means for launching monochromatic radiant energy into said structure to produce the stimulated emission of radiation in said medium and including means for stimulating the emission of coherent radiation, characterized in that
    the guiding structure includes a dielectric member having a transverse dimension in the range from about the wavelength of the monochromatic radiant energy therein to about 100 times said wavelength, and
    the launching means launches into the guiding structure the monochromatic radiant energy at a power level for which gain exceeds losses in said medium along said guiding structure,
    said guiding structure having a guiding strength that provides arbitrarily long path lengths in said fluid medium in the presence of thermal effects,
    whereby said transverse dimension enables substantially lower oscillation threshold or at the same threshold a substantially less concentrated fluid active medium than in prior art devices of the type.

2. A device of the type claimed in claim 1, in which the active medium is a Raman-active medium and the launching means comprises a source of monochromatic radiant energy of intensity below the bulk oscillation threshold in said medium.

3. A device of the type claimed in claim 1, in which the active medium is a dye laser active medium.

4. An optical apparatus for the stimulated emission of radiation, comprising
    a liquid active medium both providing gain at a first frequency and undergoing damage when subjected to an optical pumping radiation at a second frequency,
    a guiding structure including a solid member disposed in contact with and coupled to a limited region of said liquid medium, said solid member having a higher index of refraction than said liquid medium, and
    means for stimulating the coherent emission of radiation at said first frequency in said limited region of said liquid medium, whereby the remainder of said liquid medium removes the effect of the damage occurring in said liquid medium in said limited region.

5. An optical apparatus according to claim 4 in which the solid member has a transverse dimension in the range from about 0.1 micron to about 50 microns and the liquid medium in the limited region is replenished from the remainder to maintain a desired optical quality of the liquid medium in said limited region.

6. An optical apparatus according to claim 4 in which the solid member and the liquid medium differ in index of refraction by an amount insuring that a substantial portion of the pumping radiation propagates in the liquid medium.

7. An optical apparatus according to claim 4 in which the liquid medium is a Raman-active medium.

8. An optical apparatus of the type comprising
    a liquid active medium both providing gain at a first frequency and undergoing damage when subjected to an optical pumping radiation at a second frequency,
    means for subjecting said liquid medium to said pumping radiation, and
    means for stimulating the coherent radiation at said first frequency from said liquid medium,
    said apparatus being improved to remove the effect of said damage in that said subjecting means includes
    a guiding structure having a solid member disposed in contact with and coupled to a minor portion of said liquid medium, the remainder of said liquid medium replenishing said minor portion, and
    said stimulating means stimulating the coherent emission of radiation principally in said minor portion of said liquid medium.

9. An optical apparatus of the type claimed in claim 8, in which the solid member comprises a passive optical fiber surrounded by said liquid medium, said solid member having an index of refraction exeeding that of the liquid medium by an amount insuring that a substantial portion of the pumping radiation propagates in the minor portion of the liquid medium.

10. A device of the type in which an active medium is contained in a guiding structure coupled to means for launching monochromatic radiant energy into said structure to enable the stimulated emission of radiation in said medium and including means for stimulating the emission of coherent radiation, characterized in that the guiding structure comprises a dielectric capillary tube having an internal diameter in the range from about the wavelength of the monochromatic radiant energy therein to about 100 times said wavelength, and the launching means comprises a source of monochromatic radiant energy of intensity below the bulk oscillation threshold in said medium.

11. A device of the type claimed in claim 10, in which the dielectric capillary tube has an internal diameter in the range from about twice the wavelength of the monochromatic radiant energy therein to about 40 times the wavelength, and the monochromatic radiant energy source supplies monochromatic radiant energy in the frequency range from about 100 kilogigahertz to about 1,000 kilogigahertz.

12. A device of the type claimed in claim 10, in which the active medium is a Raman-active medium and the monochromatic radiant energy source supplies coherent monochromatic radiant energy with an intensity in the medium in the tube more than one order of magnitude below the level at which the energy forms filamentary regions of elevated index of refraction in said medium.

13. A super-radiant device comprising a fluid Raman-active medium having a bulk Raman-oscillation threshold, a guiding structure comprising a dielectric capillary tube containing said medium throughout a length of said tube for which said medium is super-radiant and having an internal diameter between about 0.5 micron and about 50 microns, and means for launching pumping radiation in said structure to generate super-radiance of said medium, comprising a source of coherent monochromatic visible light of intensity below said bulk oscillation threshold.

14. A super-radiant device of the type claimed in claim 13, in which the dielectric capillary tube contains the fluid Raman-active medium throughout a length exceeding 50 centimeters and has an internal diameter between about 0.5 micron and about 20 microns, and the coherent monochromatic light source supplies coherent substantially monochromatic light of a frequency exceeding 500 kilogigahertz.

15. A super-radiant device of the type claimed in claim 14, in which the coherent monochromatic source supplies coherent substantially monochromatic light of intensity more than an order of magnitude below the level at which the energy forms filamentary regions of elevated index of refraction in said medium.

16. A device of the type in which an active medium is included in a guiding structure coupled to means for launching monochromatic radiant energy into said structure to produce the stimulated emission of radiation in said medium, characterized in that the guiding structure includes a dielectric member having a transverse dimension in the range from about 0.1 micron to 50 microns, and the device includes means for storing a substantial quantity of said medium in a position facilitating flow contacting said member, and means for flowing said medium from said storing means to contact said member.

17. A device of the type claimed in claim 16, in which the flowing means comprises a source of pressurized fluid forming a fluid interface with the active medium in the storing means, said interface being laterally displaced from the path of the emitted radiation through said storing means.

18. A device of the type claimed in claim 17, including a second means for storing a substantial quantity of said medium after it has flowed from contact with said member.

19. A device of the type claimed in claim 16 in which the active medium is a dye laser active medium.

20. A frequency converter of the type in which a Raman-active medium is contained in a guiding structure disposed in an optical resonator and coupled to means for launching monochromatic radiant energy into said structure to produce in said medium Raman-scattering that can be resonated by said resonator, characterized in that the guiding structure comprises a dielectric capillary tube having an internal diameter in the range from about 0.5 micron to about 50 microns, the optical resonator comprises a pair of reflectors substantially separated from the ends of said capillary tube and adapted to resonate the Raman-scattered radiation, and the launching means comprises a source of the monochromatic radiant energy of intensity at least an order of magnitude below the bulk oscillation threshold in said medium.

21. A frequency converter of the type claimed in claim 20, in which the one of said reflectors closest to the launching means is substantially transmissive of the monochromatic radiation from said launching means and substantially totally reflective of the Raman-scattered radiation, and the other of said reflectors is substantially totally reflective of the monochromatic radiation from said launching means and partially transmissive of the Raman-scattered radiation.

22. A frequency converter of the type claimed in claim 20, in which the optical resonator includes between one end of the dielectric capillary tube and one of said separate reflectors means for storing a substantial quantity of said medium at one end of said capillary tube in flow coupling with said tube, and means for pressurizing said medium in said storing means to flow said medium from said storing means into said tube, said optical resonator including between the other end of the dielectric capillary tube and the other separated reflector means for receiving a substantial quantity of said medium flowing from said tube.

23. A frequency converter of the type claimed in claim 20, in which the optical resonator includes between one end of the dielectric capillary tube and the respective separated reflector a solid dielectric pin optically matched to the Raman-active medium and shaped to couple a selected mode of said guided structure into said structure and said medium therein.

24. A frequency converter of the type claimed in claim 20, in which
the dielectric capillary tube has a flexible coil-like configuration, and
the optical resonator includes two containers containing fluid and separating respective ones of the pair of reflectors from respective ends of the capillary tube, said containers comprising rigid members of said converter.

25. A radiant energy signal amplifier of the type in which a Raman-active medium is provided in a guided structure coupled to means for launching monochromatic radiant energy into said structure to produce Raman-scattering in said medium and coupled to means for introducing a signal into said structure at the frequency of the Raman-scattered radiation to stimulate said scattered radiation and for extracting an amplified signal from said structure, characterized in that
the guiding structure comprises a dielectric capillary tube having an internal diameter in the range from about the wavelength of the monochromatic radiant energy therein to about 100 times said wavelength, and
the launching means comprises a source of monochromatic radiant energy of intensity at least about several orders of magnitude below the bulk Raman oscillation threshold in said medium.

26. A radiant energy signal amplifier of the type claimed in claim 25, further characterized in that
the launching means is disposed at a first end of the dielectric capillary tube and
the signal introducing and extracting means is disposed at a second end of said tube.

27. A radiant energy signal amplifier of the type claimed in claim 26, in which
the introducing and extracting means includes
dichroic means for transmitting the monochromatic launched radiation at the first end of the tube while reflecting said scattered radiation at said first end, whereby the amplified signal is extracted at the opposite end of said tube.

28. A device for guiding a beam of optical radiation, comprising a plurality of sections of a transparent hollow-core dielectric tubing of a first refractive index, a transparent liquid contained in said sections filling the cores thereof and having a second refractive index higher than said first index, and means for joining said sections including
a transparent dielectric pin plugging adjacent ends of the cores of said sections and having said second index and
a viscous liquid surrounding said pin between said sections and having said first index.

29. A device according to claim 28, in which the pin is shaped to couple a selected mode of optical radiation between the sections joined by said pin.

30. A device according to claim 29, in which the transparent liquid in one of the sections comprises a Raman-active liquid.

31. A device according to claim 28, in which the viscous liquid comprises a glue.

32. An optical apparatus of the type claimed in claim 16, including means for flowing the liquid medium past the dielectric member transversely.

33. An optical apparatus of the type claimed in claim 32 in which the active medium is a dye laser active medium.

34. An optical apparatus of the type claimed in claim 32, in which the dielectric member comprises a passive optical fiber surrounded by said liquid medium, said optical fiber having an index of refraction exceeding that of the liquid by an amount insuring that a substantial portion of the pumping radiation propagates in the liquid medium, said liquid medium being a dye laser active medium.

35. An optical apparatus of the type claimed in claim 32, in which the dielectric member comprises passive dielectric material of a first index supported by a dielectric support member of a second index, said first index exceeding said second index, said liquid medium being a dye solution of index of refraction equal to said second index.

36. An optical apparatus of the type claimed in claim 35, including means for flowing the dye first past the passive dielectric member and then past the support member, said first index exceeding said second index by an amount sufficiently small to insure that the guided pumping radiation has a field distributed substantially throughout the portion of the dye solution in the plane in which it is passing said dielectric member.

* * * * *